United States Patent [19]
Grimsrud et al.

[11] Patent Number: 5,845,297
[45] Date of Patent: Dec. 1, 1998

[54] DISK BLOCK RELOCATION DE-OPTIMIZATION DETECTION METHODOLOGY AND APPLICATIONS

[75] Inventors: Knut Grimsrud, Aloha; Michael S. Ripley, Hillsboro, both of Oreg.

[73] Assignee: Intel Corporation, Santa Clara, Calif.

[21] Appl. No.: 885,326

[22] Filed: Jun. 30, 1997

[51] Int. Cl.$^6$ .................................................... G06F 17/30
[52] U.S. Cl. ........................... 707/205; 707/200; 707/201; 707/202; 707/206; 711/100; 711/104; 711/111; 711/112; 711/165; 711/171
[58] Field of Search ..................... 707/200, 205, 707/206, 201, 202; 711/100, 104, 105, 111, 112, 171, 165

[56] References Cited

U.S. PATENT DOCUMENTS

| | | | |
|---|---|---|---|
| 5,129,088 | 7/1992 | Auslander et al. | 711/171 |
| 5,551,020 | 8/1996 | Flax et al. | 707/205 |
| 5,737,743 | 4/1998 | Ooe et al. | 711/112 |

*Primary Examiner*—Thomas G. Black
*Assistant Examiner*—Thu-Thao Havan
*Attorney, Agent, or Firm*—Blakely, Sokoloff, Taylor & Zafman

[57] ABSTRACT

An apparatus is equipped with a disk block relocation de-optimization detection function that detects the de-optimization of a disk block relocation of a first disk block relocation optimization methodology by a second disk block relocation optimization methodology, employing a key file of the first disk block relocation optimization methodology. The optimization principles of the two methodologies conflict at least partially with each other. In one embodiment, the function performs the detection by monitoring disk block allocation changes to the key file whose file clusters have been allocated disk blocks in a manner that is inconsistent with one or more optimization principles of the second disk block relocation optimization methodology. In one embodiment, the function also causes the key file to be created by a file subsystem, and then reallocates the file clusters to disk blocks in the inconsistent manner.

20 Claims, 7 Drawing Sheets

DISK BLOCK RELOCATION DE-OPTIMIZATION DETECTION METHODOLOGY AND APPLICATIONS

BACKGROUND OF THE INVENTION

1. Field of the Invention

The present invention relates to the field of computer systems. More specifically, the present invention relates to data block relocation de-optimization detection methodology and apparatuses incorporated with such methodology.

2. Background Information

In the art of computer systems, many optimization problems involve relocating disk blocks. Since the objective of a later relocation optimization might conflict with the objective of an earlier relocation optimization, relocations performed for the later optimization might undo the earlier optimization. For examples, in U.S. patent application, Ser. No. 08/708,983, entitled Method and Apparatus For Improving Disk Drive Performance, filed on Sep. 6, 1996, assigned to the assignee of the present invention, certain disk block relocation methodology for improving disk drive performance was disclosed. In particular, a standalone disk block relocation utility incorporated with the disk block relocation methodology was disclosed. In U.S. patent application, Ser. No. 08/721,826, also entitled Method and Apparatus For Improving Disk Drive Performance, filed on Sep. 27, 1996, assigned to the assignee of the present invention, incorporation of the disk block relocation utility into an installation utility of an application for improving the application start up time through disk block relocation was disclosed. In U.S. patent applications, Ser. No. 08/822,640, entitled Reducing Operating System Start Up/Boot Time Through Disk Block Relocation, filed on Mar. 21, 1997, assigned to the assignee of the present invention, partial incorporation of the disk block relocation utility into an operating system for improving the start up/boot time of the operating system was disclosed. In each case, regardless of whether the disk blocks were relocated to improve disk access time, application start-up time or operating system start-up/boot time, the relocation objective is different from that of the relocation objective of a typical disk block de-fragmentation utility. In the earlier cases, data stored in discontiguous disk blocks are often relocated together in view of their order of access, whereas in the case of the de-fragmentation utility, disk blocks are typically allocated contiguously in accordance with the internal forward sequential ordering of a data object. Thus, if disk block de-fragmentation is performed subsequent to the optimization performed in any one of the above disclosed cases, it will undo the optimization, requiring the optimization to be performed again. Therefore, it is desirable to be able to detect the undoing of an optimization, and provide the opportunity for the optimization to be re-performed.

SUMMARY OF THE INVENTION

An apparatus is equipped with a disk block relocation de-optimization detection function that detects the de-optimization of a disk block relocation of a first disk block relocation optimization methodology by a second disk block relocation optimization methodology, employing a key file of the first disk block relocation optimization methodology. The optimization principles of the two disk block relocation optimization methodologies conflict at least partially with each other.

In one embodiment, the function performs the detection by monitoring disk block allocation changes to the key file whose file clusters have been allocated disk blocks in a manner that is inconsistent with one or more optimization principles of the second disk block relocation optimization methodology. In one embodiment, the function also causes the key file to be created by a file subsystem, and then reallocates the file clusters to disk blocks in the inconsistent manner.

In one embodiment, the disk block relocation de-optimization detection function is an integral part of a standalone disk block reallocator. In another embodiment, the function is an integral part of an application. In yet another embodiment, the function is an integral part of a complementary function to an operating system equipped to trace its own disk accesses during start-up/boot time.

In one embodiment, the apparatus is a computer system.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, the present invention will be described in the context of a disk block relocation problem. Those skilled in the art will recognize that the present invention may be practiced in other data relocation problems. Additionally, various aspects of the present invention will be described. Those skilled in the art will also appreciate that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

Parts of the description will be presented in terms of operations performed by a computer system, using terms such as data, flags, bits, values, characters, strings, numbers and the like, consistent with the manner commonly employed by those skilled in the art to convey the substance of their work to others skilled in the art. As well understood by those skilled in the art, these quantities take the form of electrical, magnetic, or optical signals capable of being stored, transferred, combined, and otherwise manipulated through mechanical and electrical components of the computer system; and the term computer system includes general purpose as well as special purpose data processing machines, systems, and the like, that are standalone, adjunct or embedded.

Various operations will be described as multiple discrete steps in turn in a manner that is most helpful in understanding the present invention, however, the order of description should not be construed as to imply that these operations are necessarily order dependent, in particular, the order of presentation.

Figure 1:
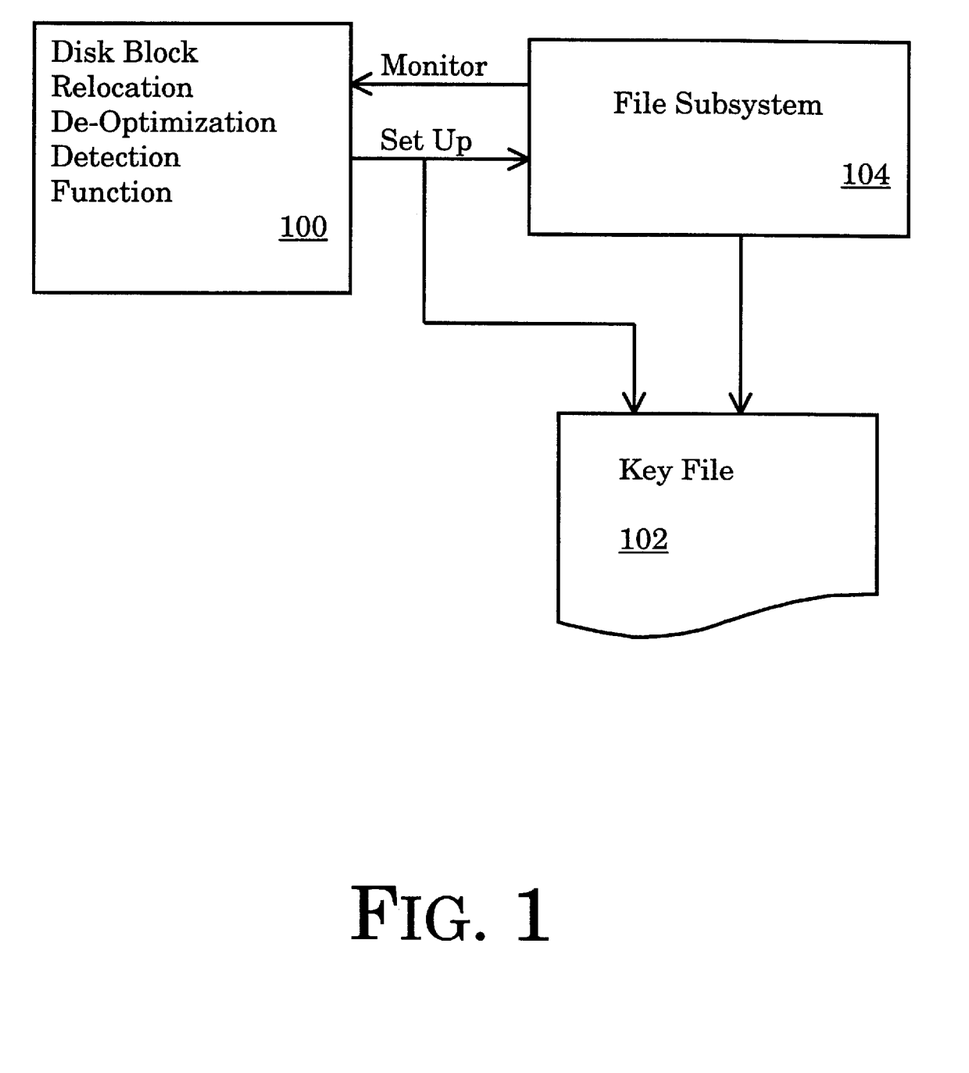
FIG. 1 is a block diagram illustrating one embodiment of the disk block relocation de-optimization detection function of the present invention.

Referring now to FIG. 1, wherein a block diagram illustrating one embodiment of the disk block relocation de-optimization detection function of the present invention is shown. Disk block relocation de-optimization detection function 100 of the present invention detects de-optimization of a disk block relocation of a first disk block relocation optimization methodology by a second disk block relocation optimization methodology, employing key file 102 of the first disk block relocation optimization methodology. The optimization principles of the two disk block relocation optimization methodologies conflict at least partially with each other.

For the illustrated embodiment, key file 102 comprises a number of file clusters. The file clusters are allocated to disk blocks in a manner that is inconsistent with one or more optimization principles of the second disk block relocation optimization methodology. Disk block relocation de-optimization detection function 100 detects the de-optimization by monitoring disk block allocation changes to disk blocks allocated to file clusters of key file 102. More specifically, for the illustrated embodiment, disk block relocation de-optimization detection function 100 monitors for disk block allocation changes, by periodically reading the disk block allocation information of key file 102 maintained by file subsystem 104, and compares the disk block allocation information read with the disk block allocation set up at the time key file 102 was first created and put into an inconsistent state, to be more fully described below.

For the illustrated embodiment, disk block relocation de-optimization detection function 100 sets up key file 102 by first causing key file 102 to be created by file subsystem 104, and then reallocating file clusters of key file 102 to disk blocks in the required inconsistent manner.

Figure 2A:
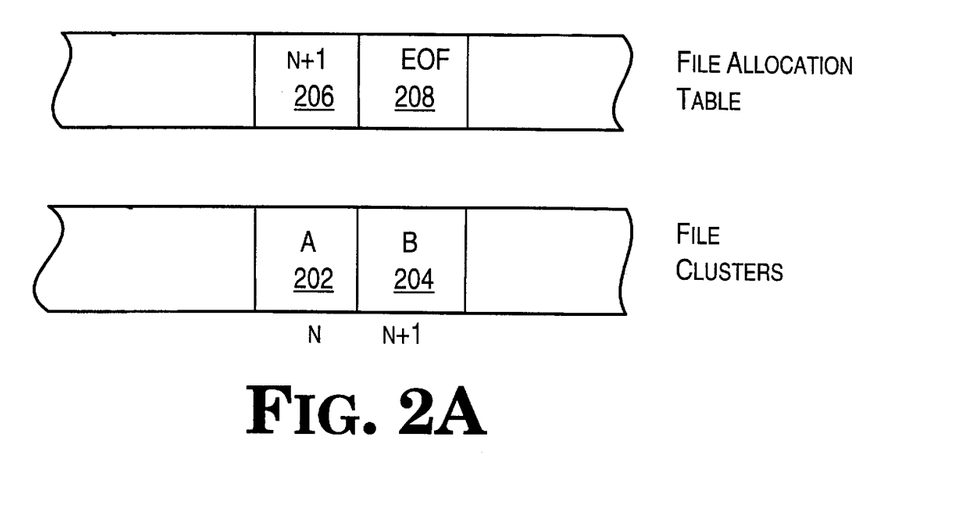
FIGS. 2A–2B illustrate an exemplary reallocation of file clusters of a key file by the disk block relocation de-optimization detection function of FIG. 1.
Figure 2B:
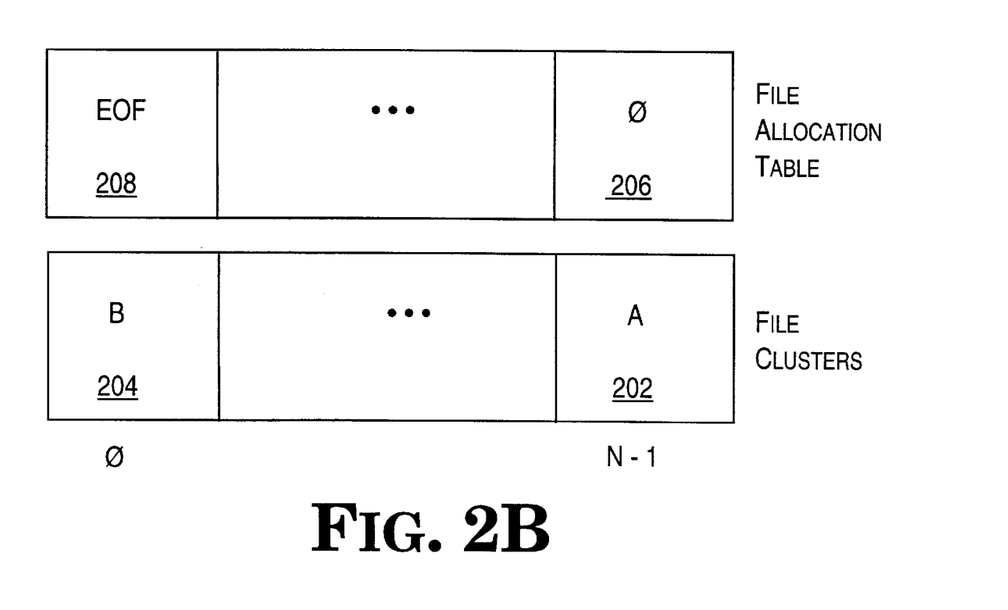

FIGS. 2A–2B illustrate an exemplary reallocation of file clusters of key file 102 by disk block relocation de-optimization detection function 100. For the illustrated exemplary reallocation, the second disk block relocation optimization methodology is disk block de-fragmentation, and key file 102 consists of two file clusters 202 and 204[1]. As typical of most file subsystems, file clusters 202 and 204 are allocated two contiguous and forward sequential disk blocks (n and n+1) as shown, when key file 102 is first created by file subsystem 104. Each of file clusters 202 and 204 has a corresponding entry 206 and 208 in the file allocation table of file subsystem 104. Entry 206 corresponding to file cluster 202 contains an index to the disk block storing file cluster 204. For this example, entry 208 corresponding to file cluster 204 contains an end-of-file notation.

Since de-fragmentation would relocate fragmented file clusters of a file to contiguous disk blocks in accordance with the internal forward sequential ordering of the file, accordingly disk block relocation de-optimization detection function 100 reallocates file clusters 202 and 204 to a set of new disk blocks in a manner that is inconsistent with at least the forward sequential ordering optimization principle. In one embodiment, disk block relocation de-optimization detection function 100 further reallocates file clusters 202 and 204 to noncontiguous disk blocks. For the exemplary reallocation, disk block relocation de-optimization detection function 100 reallocates file clusters 202 and 204 to two new disk blocks where file cluster 202 would be allocated to a disk block that is of higher forward sequential order than the disk block allocated to file cluster 204. In one embodiment, as shown, noncontiguous disk blocks are employed. In one embodiment, the first and the last disk block, or the closest available disk blocks thereof, are employed.

Figure 3:
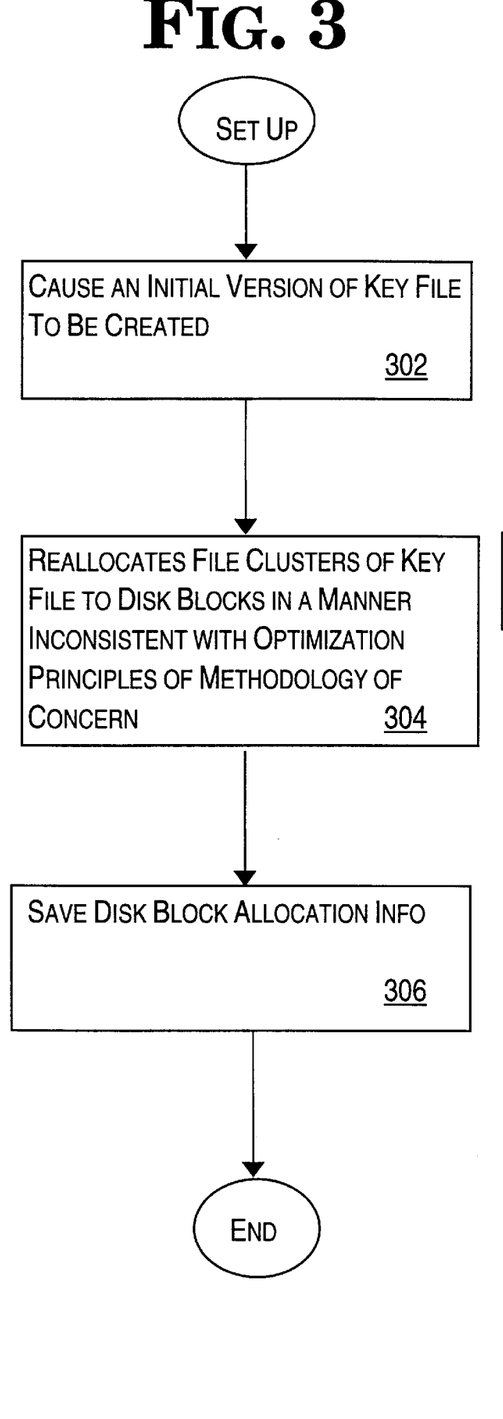
FIG. 3 illustrates one embodiment of the method steps for setting up a key file of a first disk block relocation optimization methodology to detect de-optimization of a disk block relocation of the first disk block relocation optimization methodology by a second disk block relocation optimization methodology.
Figure 4:
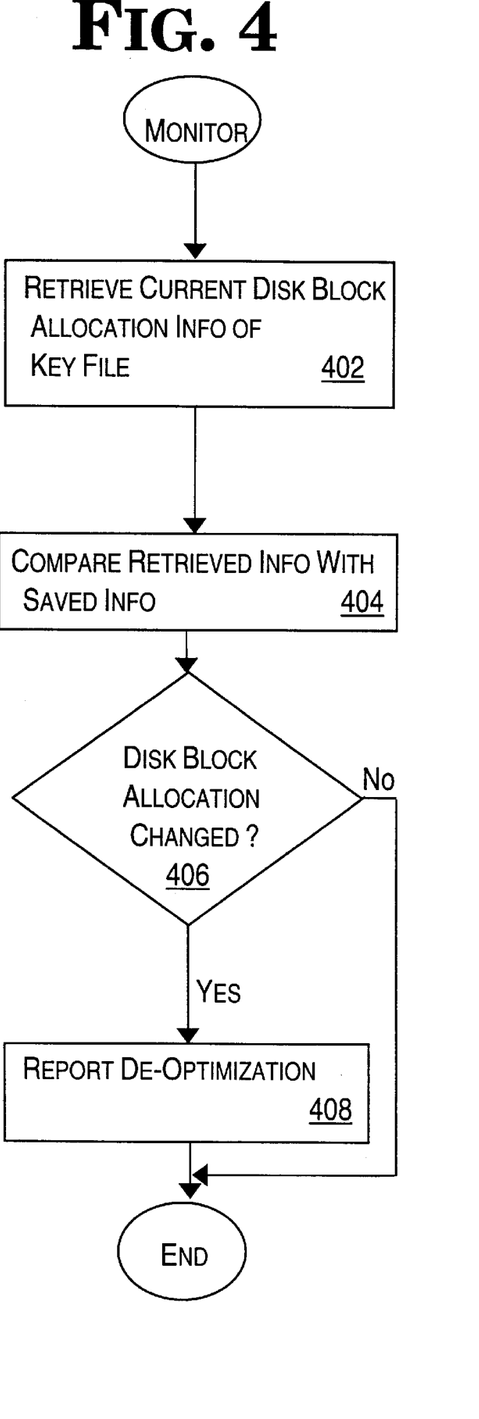
FIG. 4 illustrates one embodiment of the method steps for detecting de-optimization using the key file.

FIGS. 3 and 4 illustrate one embodiment each of the method steps for setting up key file 102 and monitoring for its disk block allocation changes. As shown in FIG. 3, the process of setting up key file 102 starts at step 302, where disk block relocation de-optimization detection function 100 causes an initial version of key file 102 to be created in a conventional manner. For the illustrated embodiment, disk block relocation de-optimization detection function 100 requests file subsystem 104 to create the initial version of key file 102. Next, at step 304, disk block relocation de-optimization detection function 100 reallocates the file clusters of key file 102 to a new set of disk blocks in a manner that is inconsistent with at least one of the optimizing principles of the second disk block relocation optimization methodology as described earlier. For the illustrated embodiment, disk block relocation de-optimization detection function 100 accesses the file allocation table of file subsystem 104 to locate the identities of the disk blocks allocated to the file clusters of key file 102. Upon identifying the disk blocks allocated to the file clusters of key file 102, disk block relocation de-optimization detection function 100 relocates the file clusters to a new set of noncontiguous and non-forward sequential disk blocks. Upon relocating the file clusters, disk block relocation de-optimization detection function 100 updates the file allocation table of file subsystem 104 accordingly. Then, at step 306, disk block relocation de-optimization detection function 100 saves a copy of the reorganized disk block allocation for key file 102 for subsequent use.

When disk block relocation de-optimization detection function 100 is invoked to perform the above described key file set up process is application dependent. In certain application, disk block relocation de-optimization detection function 100 is invoked after the first disk block relocation optimization methodology is performed, and key file 102 has not already been set up (by a previous performance of the first disk block relocation optimization methodology).

As shown in FIG. 4, the process of monitoring disk block allocation changes to key file 102 starts at step 402, where disk block relocation de-optimization detection function 100 retrieves the current disk block allocation information for key file 102. For the illustrated embodiment, disk block relocation de-optimization detection function 100 accesses the file allocation table of file subsystem 104 to retrieve the current disk block allocation for key file 102. Next, at step 404, disk block relocation de-optimization detection function 100 compares the current disk block allocation information with the initial disk block allocation to determine disk block allocations for the file clusters of key file 102 have been changed. If changes are detected, disk block relocation de-optimization detection function 100 reports de-optimization of disk block relocations of the first disk block relocation optimization methodology by the second disk block relocation optimization methodology, step 408, otherwise the process terminates.

The monitoring process is preferably performed on a periodic basis. The frequency of performance is application dependent. In one embodiment, the periodic performance is effectuated by scheduling periodic invocation of disk block relocation de-optimization detection function 100 with the operating system. Alternatively, self-rescheduling, or other timing approaches may be employed to cause the periodic monitoring to be performed.

Figure 5:
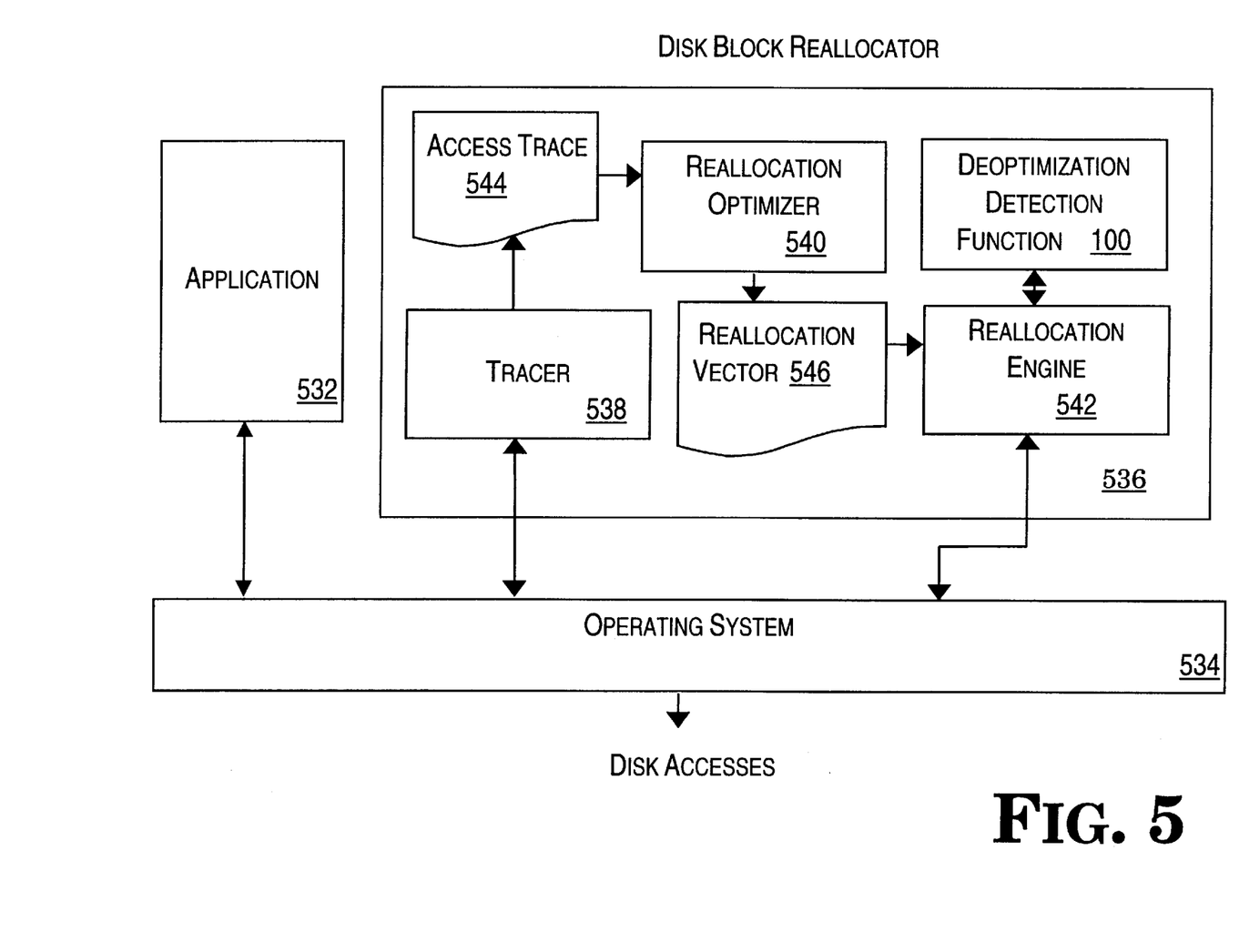
FIGS. 5–7 illustrate three exemplary applications of the present invention.

FIGS. 5–8 illustrate three exemplary applications of the present invention. In FIG. 5, disk block relocation de-optimization detection function 100 is incorporated as an integral part of a standalone disk block reallocator 536. In addition to disk block relocation de-optimization detection function 100, disk block reallocator 536 includes tracer 538, reallocation optimizer 540, and relocation engine 542. Tracer 538 is used to generate access trace 544 comprising traces of a sequence of disk accesses of interest. Reallocation optimizer 540 is used to determine if an improved disk block allocation can be found, using access trace 544. If an improved disk block allocation can be found, reallocation optimizer 540 generates reallocation vector 546 specifying how certain disk blocks are to be reallocated, i.e. relocated. For the illustrated embodiment, reallocation vector 546 is generated in the conventional destination oriented manner, and relocation engine 542 effectuates the desired relocation, using a source oriented data move technique. Furthermore, disk block relocation de-optimization detection function 100 leverages on the file subsystem access functionality of relocation engine 542. For further description of tracer 538, access trace 544, reallocation optimizer 540, and reallocation engine 542, see U.S. patent application, Ser. No. 08/708, 983, and U.S. patent application Ser. No. 08/885,327, filed contemporaneously which are hereby fully incorporated by reference.

Figure 6:
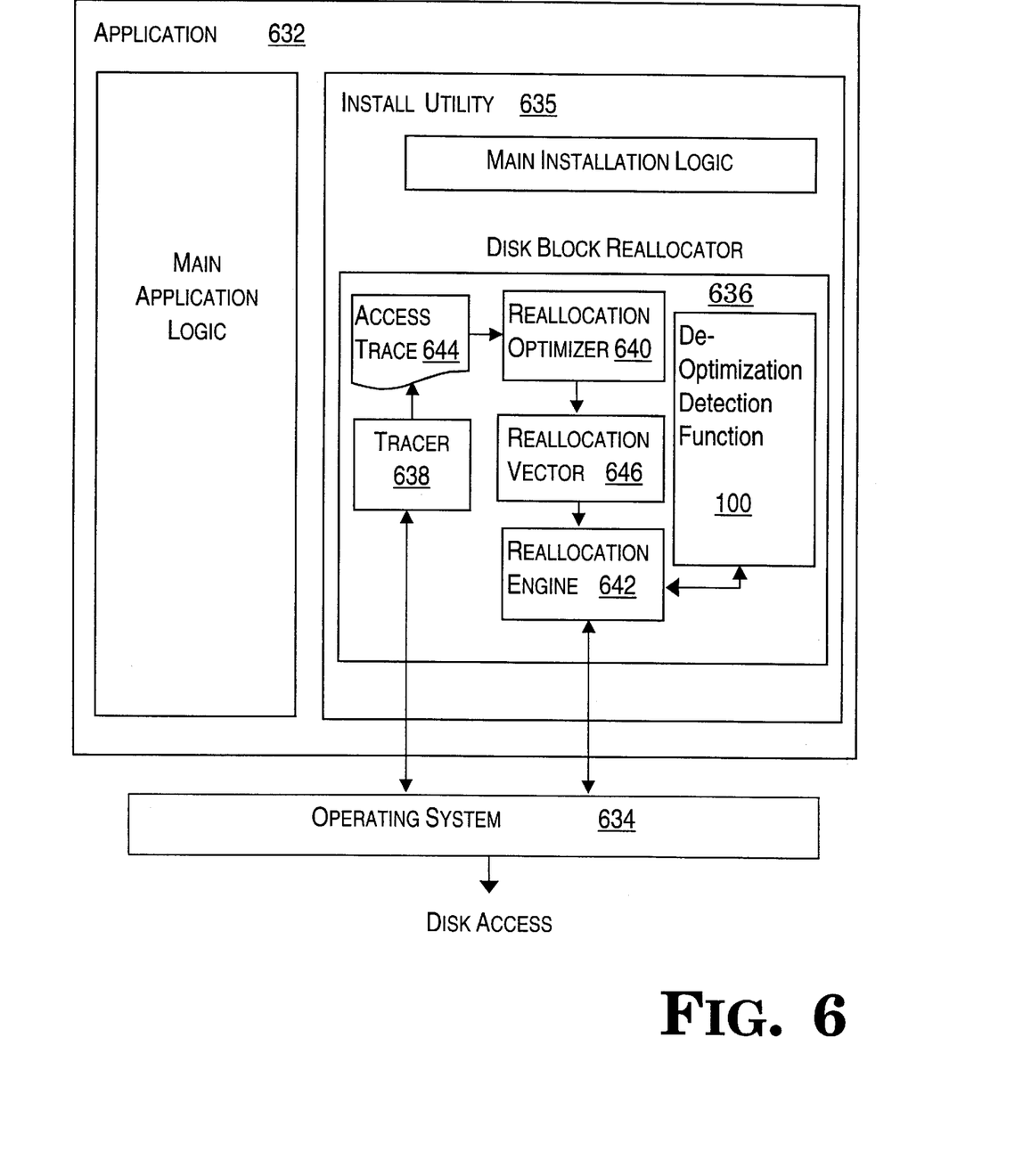

Similarly, in FIG. 6, disk block relocation de-optimization detection function 100 is incorporated as an integral part of disk block reallocator 636, which is included in application 632. More specifically, for the illustrated embodiment, disk block reallocator 636 is included in installation utility 635 of application 632. In addition to disk block relocation de-optimization detection function 100, disk block reallocator 636 also includes tracer 638, reallocation optimizer 640 and reallocation engine 642. Tracer 638 is used to generate access trace 644 comprising traces of a sequence of start-up disk accesses of application 632. Reallocation optimizer 640 is used to determine if an improved disk block allocation can be found, using access trace 644, to improve start-up time of the application. If an improved disk block allocation can be found, reallocation optimizer 640 generates reallocation vector 646 specifying how certain disk blocks are to be reallocated, i.e. relocated. For the illustrated embodiment, reallocation vector 646 is generated in the conventional destination oriented manner, and reallocation engine 642 effectuates the desired relocation, using a source oriented data move technique, to improve the start-up time of application 632. Furthermore, disk block relocation de-optimization detection function 100 leverages on the file subsystem access functionality of relocation engine 642. For further description of tracer 638, access trace 644 and reallocation optimizer 640, see U.S. patent application, Ser. No. 08/721,826, and U.S. patent application Ser. No. 08/885, 327, filed contemporaneously which are hereby fully incorporated by reference.

Figure 7:
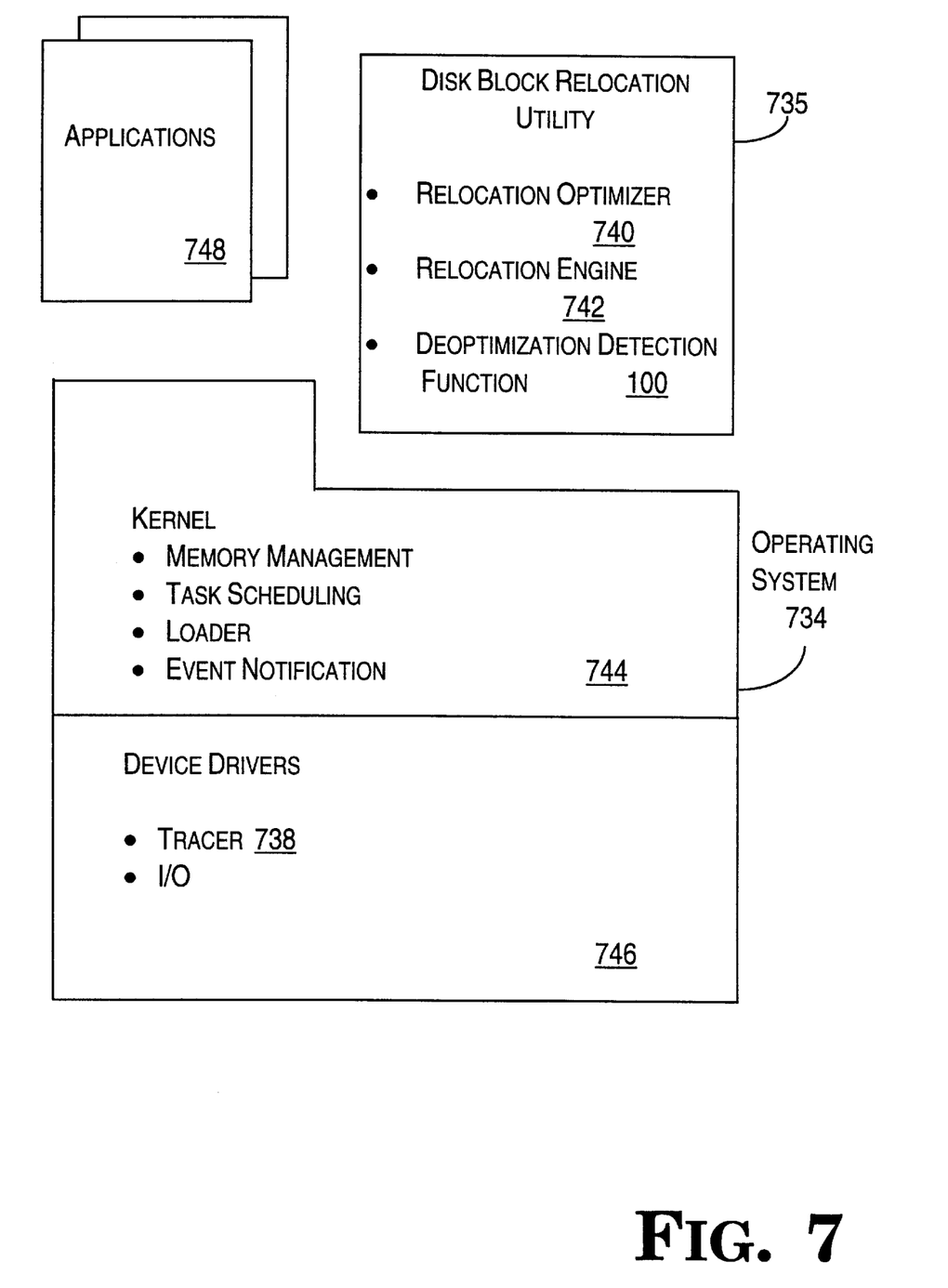

Likewise, in FIG. 7, disk block relocation de-optimization detection function 100 is incorporated as an integral part in a complementary disk block relocation utility 735. In addition to disk block relocation de-optimization detection function 100, disk block relocation utility 735 includes relocation optimizer 740 and relocation engine 742. Additionally, operating system 734 is provided with tracer 738. Tracer 738 is used to generate access traces (not shown) comprising traces of a sequence of disk accesses by operating system 734 during system start-up/boot time. Reallocation optimizer 740 is used to determine if an improved disk block allocation can be found, using the generated access traces, to improve the start-up/boot time of the operating system. If an improved disk block allocation can be found, relocation optimizer 740 generates a relocation vector (not shown) specifying how certain disk blocks are to be relocated. For the illustrated embodiment, the relocation vector is generated in the conventional destination oriented manner, and relocation engine 742 effectuates the desired relocation, using a source oriented data move technique, to improve the start-up/boot time of the operating system. Furthermore, disk block relocation de-optimization detection function 100 leverages on the file subsystem access functionality of relocation engine 742. For further description of tracer 738, relocation optimizer 740, and relocation engine 742 see U.S. patent application, Ser. No. 08/822,640, and U.S. patent application Ser. No. 08/885,327 which are hereby fully incorporated by reference.

Additionally, for each of the applications, tracer 538, 638 or 738 may trace logical file accesses, and then map the logical file accesses to physical disk block accesses, as opposed to tracing the physical disk block accesses directly, as disclosed in U.S. patent application Ser. No. 08/885,325, which is also hereby fully incorporated by reference.

While in each of the above illustrated applications, disk block de-optimization detection function 100 was shown as an integral part of a utility, an application or an operating system, the present invention may also be practiced with disk block de-optimization detection function 100 as a stand-alone utility.

Figure 8:
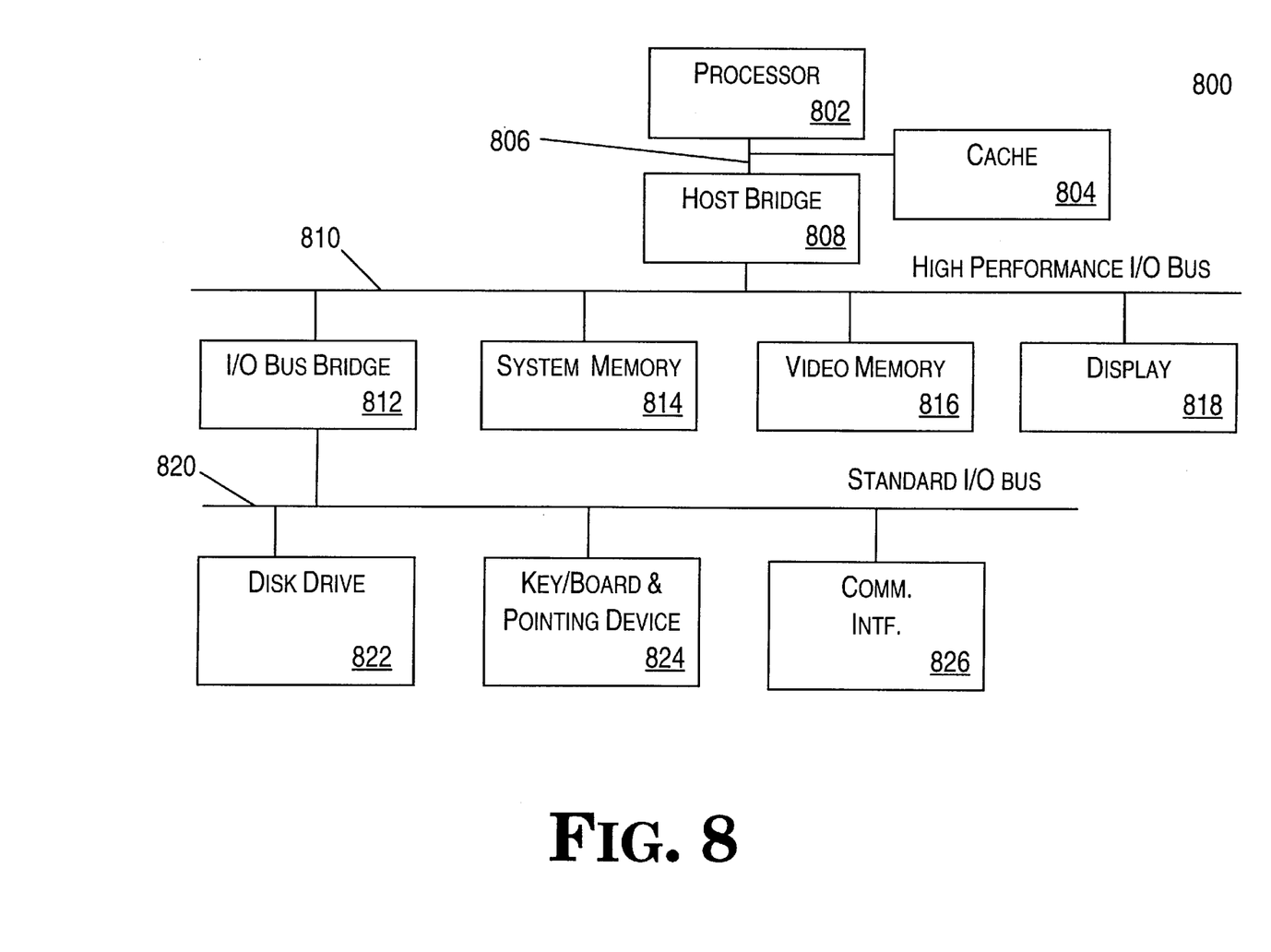
FIG. 8 illustrates one embodiment of a computer system suitable for programming with the disk block relocation de-optimization detection function of the present invention.

FIG. 8 illustrates one embodiment of a computer system suitable for equipping with disk block relocation de-optimization detection function 100 of the present invention described above. As shown, for the illustrated embodiment, computer system 800 includes processor 802, processor bus 806, high performance I/O bus 810 and standard I/O bus 820. Processor bus 806 and high performance I/O bus 810 are bridged by host bridge 808, whereas I/O buses 810 and 812 are bridged by I/O bus bridge 812. Coupled to processor bus 806 is cache 804. Coupled to high performance I/O bus 810 are system memory 814 and video memory 816, against which video display 818 is coupled. Coupled to standard I/O bus 820 are disk drive 822, keyboard and pointing device 824 and communication interface 826.

These elements perform their conventional functions known in the art. In particular, disk drive 822 and system memory 814 are used to store a permanent and a working copy of the programming instructions of disk block relocation de-optimization detection function 100 of the present invention, effectuating the teachings of the present invention, when executed by processor 802. The permanent copy may be pre-loaded into disk drive 822 in factory, loaded from a distribution medium (not shown), or down loaded from on-line/networked distribution source (not shown). The constitutions of these elements are known. Any one of a number of implementations of these elements known in the art may be used to form computer system 800.

While the method and apparatus of the present invention have been described in terms of the illustrated embodiments, those skilled in the art will recognize that the invention is not limited to the embodiments described. The present invention can be practiced with modification and alteration within the spirit and scope of the appended claims. The description is thus to be regarded as illustrative instead of restrictive on the present invention.

Thus, a disk block relocation de-optimization detection methodology and various applications of the methodology have been described.

What is claimed is:

1. An apparatus comprising
    (a) an execution unit for executing programming instructions; and
    (b) a storage medium coupled to the execution unit and having stored therein a plurality of programming instructions to be executed by the execution unit for implementing a disk block relocation de-optimization detection function that detects the de-optimization of a disk block relocation of a first disk block relocation optimization methodology by a second disk block relocation optimization methodology, employing a key file of the first disk block relocation optimization methodology, the two methodologies having one or more optimization principles that conflict at least partially with each other.

2. The apparatus as set forth in claim 1, wherein the plurality of programming instructions detect the de-optimization by monitoring disk block allocation changes to the key file of the first disk block relocation optimization methodology.

3. The apparatus as set forth in claim 1, wherein the plurality of programming instructions include programming instructions for causing the key file of the first disk block relocation methodology to be created by a file subsystem, and then reallocating file clusters of the key file to disk blocks in a manner that is inconsistent with the one or more optimization principles of the second disk block relocation optimization methodology.

4. The apparatus as set forth in claim 3, wherein the second disk block relocation optimization methodology is disk block de-fragmentation, and the plurality of programming instructions reallocate the file clusters of the key file to disk blocks in at least a non-forward sequential ordering manner.

5. The apparatus as set forth in claim 4, wherein the plurality of programming instructions also reallocate the file clusters of the key file to disk blocks in a non-contiguous placement manner.

6. The apparatus as set forth in claim 1, wherein the disk block relocation de-optimization detection function is an integral part of a standalone disk block reallocator.

7. The apparatus as set forth in claim 1, wherein the disk block relocation de-optimization detection function is an integral part of an application.

8. The apparatus as set forth in claim 1, wherein the disk block relocation de-optimization detection function is an integral part of a complementary function to an operating system equipped to trace its own disk accesses during start-up/boot time.

9. The apparatus as set forth in claim 1, wherein the apparatus is a computer system.

10. A machine implemented method comprising the steps of:
    a) monitoring for disk block allocation changes to a key file of a first disk block relocation optimization methodology; and
    b) upon detection of disk block allocation changes to the key file, reporting de-optimization of disk block relocations of the first disk block relocation optimization methodology by a second disk block relocation optimization methodology, the two methodologies having optimization principles that conflict at least partially with each other.

11. The method as set forth in claim 10, wherein the method further comprises the steps of:
    c) causing the key file of the first disk block relocation optimization methodology to be first created by a file subsystem; and
    d) re-allocating file clusters of the key file to disk blocks in a manner that is inconsistent with one or more optimization principles of the second disk block relocation optimization methodology.

12. The method as set forth in claim 11, wherein the second disk block relocation optimization methodology is disk block de-fragmentation, and step (d) comprises reallocating the disk blocks allocated to the file clusters of the key file in at least a non-forward sequential ordering manner.

13. The method as set forth in claim 12, wherein the disk block reallocation of step (d) further includes a non-contiguous manner of placement.

14. A machine readable storage medium having stored therein a plurality of programming instructions that implements the method steps of:
    a) monitoring for disk block allocation changes to a key file of a first disk block relocation optimization methodology; and
    b) upon detection of disk block allocation changes to the key file, reporting de-optimization of disk block relocations of the first disk block relocation optimization methodology by a second disk block relocation optimization methodology, the two methodologies having optimization principles that conflict at least partially with each other.

15. The storage medium as set forth in claim 14, wherein the programming instructions further implement the method steps of:
    c) causing the key file of the first disk block relocation optimization methodology to be first created by a file subsystem; and
    d) re-allocating file clusters of the key file to disk blocks in a manner that is inconsistent with one or more optimization principles of the second disk block relocation optimization methodology.

16. The storage medium as set forth in claim 15, wherein the second disk block relocation optimization methodology is disk block de-fragmentation, and step (d) comprises reallocating the disk blocks allocated to the file clusters of the key file in at least a non-forward sequential ordering manner.

17. The method as set forth in claim 16, wherein the disk block reallocation of step (d) further includes a non-contiguous manner of placement.

18. The storage medium of claim 14, wherein the disk block relocation de-optimization detection function is an integral part of a standalone disk block reallocator.

19. The storage medium of claim 14, wherein the disk block relocation de-optimization detection function is an integral part of an installation utility of an application.

20. The storage medium of claim 14, wherein the disk block relocation de-optimization detection function is an integral part of a complementary function to an operating system equipped to trace disk its own accesses during start-up/boot time.

* * * * *